United States Patent
Adedeji et al.

(10) Patent No.: US 6,274,670 B1
(45) Date of Patent: Aug. 14, 2001

(54) SEMI-TRANSPARENT BLENDS OF POLYPHENYLENE ETHER, STYRENIC RESINS, AND ELASTOMERIC BLOCK COPOLYMERS

(75) Inventors: Adeyinka Adedeji, Albany; Mark V. Vendon, Westerlo, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/216,903

(22) Filed: Dec. 21, 1998

(51) Int. Cl.$^7$ ........................................ C08L 71/12
(52) U.S. Cl. ............................. 525/92 D; 525/89
(58) Field of Search ............................. 525/92 D

(56) References Cited

U.S. PATENT DOCUMENTS

| | | |
|---|---|---|
| 3,383,435 | 5/1968 | Cizek . |
| 3,639,508 | 2/1972 | Kambour . |
| 3,660,531 * | 5/1972 | Lauchlan ........................ 525/92 D |
| 4,097,550 | 6/1978 | Haaf et al. . |
| 4,101,503 | 7/1978 | Cooper et al. . |
| 4,101,504 | 7/1978 | Cooper et al. . |
| 4,101,505 | 7/1978 | Cooper et al. . |
| 4,113,800 | 9/1978 | Lee, Jr. . |
| 4,128,602 | 12/1978 | Katchman et al. . |
| 4,139,574 | 2/1979 | Cooper et al. . |
| 4,154,712 | 5/1979 | Lee, Jr. . |
| 5,234,994 * | 8/1993 | Shiraki ........................ 525/92 D |
| 5,434,220 * | 7/1995 | Yoshimara ..................... 525/92 D |

FOREIGN PATENT DOCUMENTS

| | | |
|---|---|---|
| 0 048 397 | 3/1982 | (EP) . |
| 0367188 | 5/1990 | (EP) . |
| 0 550 210 A1 | 7/1993 | (EP) . |
| 0 930 340 A2 | 7/1999 | (EP) . |
| 0 930 341 A2 | 7/1999 | (EP) . |

OTHER PUBLICATIONS

Kraton Product Literature Database, bx;1http://www.kraton.com/literature/ASPapp/results.asp, 1 page.

Kraton G–1650 Thermoplastic Rubber Data Document, Issued Apr. 2000, 3 pages.

* cited by examiner

Primary Examiner—Patricia A. Short

(57) ABSTRACT

The invention relates to a semi-transparent thermoplastic composition of a polyphenylene ether resin, a non-elastomeric styrenic resin, and an unsaturated elastomeric styrenic block copolymer. The compositions of the invention may also contain at least one additive selected from the group consisting of stabilizers, dyes, pigments, mineral oil, and mixtures thereof and exhibit enhanced physical properties, especially ductility. The invention also relates to articles formed out of the compositions of the invention as well as methods to make the compositions.

22 Claims, No Drawings

SEMI-TRANSPARENT BLENDS OF POLYPHENYLENE ETHER, STYRENIC RESINS, AND ELASTOMERIC BLOCK COPOLYMERS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to semi-transparent thermoplastic compositions of a polyphenylene ether resin, a non-elastomeric styrenic resin, and an elastomeric styrenic block copolymer, wherein the percentage of light transmission between about 350 nm to about 700 nm is at least 28% of the incident light when measured at a thickness of 0.125 inches. In a preferred embodiment, the non-elastomeric styrenic resin is selected from the group consisting of radial block copolymers of butadiene and styrene wherein the styrene content in the copolymers is at least 50% by weight based on the weight of the copolymer, tapered block copolymers of butadiene and styrene wherein the styrene content in the copolymer is at least 50% by weight based on the weight of the copolymer, and mixtures of the foregoing. In another preferred embodiment, the elastomeric styrenic block copolymer is selected from the group consisting of polystyrene-polybutadiene (SBR), poly($\alpha$-methylstyrene)-polybutadiene, polystyrene-polybutadiene-polystyrene (SBR), and mixtures of the foregoing. The compositions may, optionally, contain at least one dye.

The invention also relates to articles formed out of the compositions of the invention.

2. Brief Description of the Related Art

In the food handling area, clamshell styled containers having an opaque bottom and a see-through top are in great demand for prepared foods. Busy consumers desire to purchase entrees at a local store or restaurant and take the meal home for the family meal. Reheating the food in a microwave oven is often the method of choice because of convenience and time and consequently the clamshell styled containers must have sufficient heat resistance to withstand steam and hot greases and oils. Additionally, the containers must have sufficient ductility to not break on handling and use by both the food preparer and the consumer.

In order to achieve great penetration into the clamshell styled container market, a resin needs to be of low cost and have outstanding processability, have sufficient transparency for food to be seen through the container top, have sufficient ductility to withstand breakage, and be able to resist hot greases and oils from foods on heating in a microwave oven.

Polystyrene resins are widely used thermoplastic resins because of their low cost and easy processability. These resins are available as homopolymer polystyrene (often called crystal polystyrene), as block copolymers with elastomeric materials (e.g., S-B-S, S-(EB)-S, S-EP copolymers), and as impact modified graft resins with polybutadiene resin (HIPS). Within these categories, there are flame-retardant, abrasion resistant, super-tough, UV-resistant, expandable, and environmental stress crack resistant grades that enable these resins to be used in a wide variety of everyday consumer goods such as toys, packaging, housewares, construction materials, automobile parts, and disposables.

Polystyrene resins are currently used in many clamshell designed containers, both in foamed opaque clamshells and in containers having see-through lids. Unfortunately, the properties of the various polystyrene resins are insufficient albeit for different reasons for great penetration into the market for clamshell styled containers having an opaque bottom and a see-through top. For example, crystal polystyrene is insufficient in ductility although acceptable in cost, processing, and transparency for the top. Addition of rubbery styrenic copolymers (S-B-S, S-EB-S) to crystal polystyrene improves the ductility but at the expense of the necessary transparency. High impact polystyrene (i.e., HIPS) has good impact strength but is not transparent. Polystyrene-butadiene radial block copolymers containing over fifty percent styrene exhibit good ductility, cost, and transparency but are insufficient in heat resistance.

Poly(phenylene ether) resins (referred to hereafter as "PPE") are commercially attractive materials because of their unique combination of physical, chemical, and electrical properties. Commercially, most PPE are sold as blends with predominantly high impact polystyrene resins. PPE are miscible with polystyrene resins in all proportions and because of the very high glass transition temperatures of PPE, the blends of PPE with polystyrene resins possess higher heat resistance than that of the polystyrene resins alone. Moreover, the combination of PPE with high impact polystyrene resins results in additional overall properties such as high flow and ductility, however, such blends are not transparent or even semi-transparent. Examples of such blends can be found in U.S. Pat. Nos. 3,383,435; 4,097,550; 4,113,800; 4,101,503, 4,101,504; 4,101,505; 4,128,602; 4,139,574; and 4,154,712 among others. The properties of these blends can be further enhanced by the addition of various additives such as flame retardants, light stabilizers, processing stabilizers, heat stabilizers, antioxidants and fillers but none of these additives results in transparent or semi-transparent compositions that would be useful for the aforementioned clamshell styled containers having a see-through top.

It is therefore apparent that there continues to be a need for improved compositions as well as processes to manufacture compositions containing polyphenylene ether resins that have acceptable ductility, heat resistance, and transparency for use in clamshell styled containers having a see-through top.

SUMMARY OF THE INVENTION

The needs discussed above have been generally satisfied by the discovery of a semi-transparent thermoplastic composition comprising a poly(phenylene ether) resin, a non-elastomeric styrenic resin, and an unsaturated elastomeric styrenic block copolymer, wherein the percentage of light transmission between about 350 nm to about 700 nm is at least 28% of the incident light when measured at a thickness of 0.125 inches.

In a first preferred embodiment, the invention includes a semi-transparent thermoplastic composition comprising at least about 60% by weight of a poly(phenylene ether) resin based on the weight of the entire composition, about 39% to about 1% by weight of a non-elastomeric styrenic resin, and about 1% to about 5% by weight of an unsaturated elastomeric styrenic block copolymer, wherein the percentage of light transmission between about 350 nm to about 700 nm is at least 28% of the incident light when measured at a thickness of 0.125 inches.

In second preferred embodiment, the invention includes a semi-transparent thermoplastic composition comprising:

a) a poly(phenylene ether) resin, b) a non-elastomeric styrenic resin is selected from the group consisting of radial block copolymers of butadiene and styrene wherein the styrene content in the copolymers is at least 50% by weight based on the weight of the copolymer, tapered block copolymers of butadiene and styrene wherein the styrene content in the copolymer is at least 50% by weight based on the weight of the copolymer, homo- polystyrene, and mixtures of the foregoing, and c) an elastomeric styrenic block copolymer is selected from the group consisting of polystyrene-polybutadiene (SBR), poly($\alpha$-methylstyrene)-polybutadiene, and polystyrene-polybutadiene-polystyrene (SBS), and mixtures of the foregoing;

wherein the percentage of light transmission between about 350 nm and about 700 nm is at least 28% of the incident light when measured at a thickness of 0.125 inches.

The compositions may optionally include at least one additive selected from the group consisting of stabilizers, dyes, pigments, mineral oil, and mixtures thereof.

These and other embodiments will become apparent in the description which follows that provides further details regarding this invention.

DESCRIPTION OF THE DRAWINGS

Not applicable.

DETAILED DESCRIPTION OF THE INVENTION

Poly(phenylene ether) resins are a well known class of compounds sometimes referred to as poly(phenylene oxide) resins. Examples of suitable PPE and processes for their preparation can be found in, for example, U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred PPE used in compositions of the present invention are derived from 2,6-dimethyl phenol. Also contemplated are PPE copolymers derived from 2,6-dimethyl phenol and 2,3,6-trimethyl phenol. Useful PPE include poly(2,6-dimethyl-1,4-phenylene ether) resin having an intrinsic viscosity (I.V.) of between about 0.10 and about 0.60 dl/g as measured in toluene at 25° C. and a concentration of 0.6 gram per 100 ml. In a preferred embodiment of the invention, the PPE have an intrinsic viscosity (I.V.) of between about 0.25 and about 0.49 dl/g as measured in toluene at 25° C. and a concentration of 0.6 gram per 100 ml.

The present compositions also contain, as component B, a polystyrene homopolymer (referred to hereinafter as "crystal polystyrene"), a non-elastomeric styrenic resin, or mixtures of the two.

The non-elastomeric styrenic resin is selected from the group consisting of radial block copolymers of butadiene and styrene wherein the styrene content in the copolymers is at least 50% by weight based on the weight of the copolymer, linear di-block, tri-block copolymer and tapered block copolymer as well as various mixtures of any of the foregoing copolymers wherein the styrene content in the copolymer is at least 50% by weight based on the weight of the copolymer. The butadiene block length and structure preferably results in butadiene domains that are smaller than the wavelength of visible light and/or results in a refractive index that matches crystal polystyrene such that the resultant composition has a light transmission between about 350 nm to about 700 nm is at least 28% of the incident light when measured at a thickness of 0.125 inches. Various mixtures of the foregoing are also included in the present invention. When the butadiene block length and structure results in butadiene domains that are larger than the wavelength of visible light and/or has an unmatched refractive index, the transparency of the compositions is unacceptable. The composition may optionally contain crystal polystyrene, either alone or in combination with a non-elastomeric radial block copolymer or non-elastomeric linear or tapered block copolymer.

The radial block copolymers are derived from vinyl aromatic monomers and conjugated diene monomers and are well known in the art. The preferred vinyl aromatic monomer is styrene and the preferred conjugated diene monomer is 1,3-butadiene. Copolymers of this type generally comprise from about 60 to about 95 percent by weight polymerized vinyl aromatic monomer and about 40 to about 5 percent by weight polymerized conjugated diene monomer.

By radial block copolymer is meant a radial architecture wherein the copolymer has at least three polymer chains which form a radial configuration, and each chain usually terminates with a substantially non-elastomeric segment (the polymerized vinyl aromatic monomer segment), to which an elastomeric polymer segment is joined (the polymerized conjugated diene monomer segment). These radial block copolymers are also referred to "polymodal branched block copolymers" and "star polymers".

The production of radial block copolymers is broadly disclosed in U.S. Pat. Nos. 3,639,517; 4,091,053; and 4,584,346, the disclosures of which are hereby incorporated by reference. Briefly, polymerization involves the first addition of a monovinyl-substituted aromatic component monomer (e.g., styrene) along with an organolithium initiator to produce a group of monovinyl-substituted aromatic component polymer blocks terminated with lithium atoms followed by the introduction of additional initiator and additional monovinyl-substituted aromatic compound monomer so as to produce a second group of monovinyl- substituted aromatic component polymer blocks also terminated with lithium atoms. Thereafter, the conjugated diene monomer (e.g., 1,3-butadiene) is introduced to form chains consisting of monovinyl-substituted aromatic component-diene blocks terminated with lithium atoms having varying lengths because of the multiple addition of the monovinyl-substituted aromatic compound monomer and initiator. Thereafter, a polyfunctional coupling agent having at least three functional groups per molecule is employed to join together a plurality of these chains so as to form polymer molecule having terminal polymerized monovinyl-substituted aromatic component blocks. These block copolymers are commercially available under the tradename K-Resin from Phillips Petroleum.

The radial block polymers of component B are further characterized as follows: the polymerized monovinyl-substituted aromatic compound monomer content in the relatively high molecular weight diblock polymer chains produced by the first addition of monomer and initiator and conjugated diene addition is calculated to be less than 90 weight percent, preferably 80 to 89, more preferably 84 to 85 weight percent. The polymerized monovinyl-substituted aromatic compound monomer content in the relatively low molecular weight diblock polymer chains produced as a result of the second addition of monomer and initiator and conjugated diene addition is greater than 46 weight percent, preferably 47 to 70, more preferably 49 to 67 weight percent.

The ratio of the calculated number average molecular weight of the polymerized monovinyl-substituted aromatic compound monomer block in the high and low molecular weight portions (portions resulting from the first and second initiator and monovinyl-substituted aromatic compound monomer additions, respectively) is 3 to 7, preferably 3.5 to 4.8. The ratio of the calculated number average molecular weight of the total monovinyl-substituted aromatic compound-diene block of the high and low molecular weight portions respectively, is less than 4.5, preferably 2 to 4, more preferably 2.5 to 3.3.

The copolymers have a total weight percent monovinyl-substituted aromatic compound content within the range of 65 to 80, more preferably 75 to 77, most preferably about 76 weight percent.

As previously mentioned, the non-elastomeric styrenic resin may be a linear di-block, and/or a tri-block copolymer and may also be a tapered block copolymer as well as various mixtures of any of the foregoing copolymers.

These tapered block copolymers are derived from vinyl aromatic monomers and conjugated diene monomers and are also well known in the art. The preferred vinyl aromatic monomer is styrene and the preferred conjugated diene monomer is 1,3-butadiene. Copolymers of this type generally comprise from about 60 to about 95 percent by weight polymerized vinyl aromatic monomer and about 40 to about 5 percent by weight polymerized conjugated diene monomer.

Those of ordinary skill in the polymer arts understand the concept of "tapering". Furthermore, techniques for achieving tapered polymers or copolymers are well-known in the art. Examples of references which relate to tapered polymers are U.S. Pat. Nos. 4,948,832; 4,939,207; 4,918,145; 4,914,248; 4,913,971; and 4,116,917, all of which are incorporated herein by reference.

The vinyl aromatic polymer of the tapered block copolymer is preferably in a form which includes both random and block structural units, with the weight ratio of random to block usually being in the range of about 1.5:1 to about 4:1, and more preferably, within the range of about 2.5:1 to about 3:1. Some of the suitable materials of this type contain a block of the vinyl aromatic polymer having a molecular weight of about 10,000 to about 30,000, followed by a block of the polymerized conjugated diene having a molecular weight of about 25,000 to about 65,000, which itself is linked to a random block of vinyl aromatic-conjugated diene polymer (for example, a random block of styrene-butadiene), having a molecular weight of about 30,000 to about 80,000. The random block 5 may be attached at its opposite end to another vinyl aromatic polymeric block, usually having a molecular weight of about 30,000 to about 80,000.

In some preferred embodiments, the $A^1$ block of the block copolymer is derived from a monomer selected from the group consisting of styrene, alpha-methyl styrene, para-methyl styrene, vinyl toluene, vinyl xylene, and combinations of such monomers. The $B^1$ block is preferably derived from a monomer selected from the group consisting of butadiene, isoprene, ethylene, butylene, 1,3-pentadiene, 2,3-dimethyl butadiene, and combinations thereof. It is also possible that the tapered block copolymer can contain more than one type of $A^1$ and/or $B^1$ block.

Tapered linear styrene-butadiene-styrene (SBS) "tri-block" copolymers falling within the molecular weight ranges described above are especially suitable for use in the invention. Examples of such a material include FINA-CLEAR™ 520 and FINACLEAR™ 530, commercially available products available from Fina Oil and Chemical Company.

The present compositions also contain, as component C, an elastomeric styrenic block copolymer selected from the group consisting of polystyrene-polybutadiene (SBR), poly (α-methylstyrene)-polybutadiene, and polystyrene-polybutadiene-polystyrene (SBS), and mixtures of the foregoing. The weight average molecular weight of the copolymer is typically in the range of about 50,000 to about 300,000. Suitable copolymers are commercially available from Shell Chemical Company under the trademark KRATON and include, for example, D1101 and D1102 and from Dexco Company under the trademark VECTOR and include, for example, grade 2518.

In some preferred embodiments, it should be clear that the thermoplastic compositions of the present invention are substantially free of other thermoplastic resins with the exception of the optional homopolystyrene resin. The other thermoplastic resins that the compositions should be substantially free of include polyamide resins, high impact polystyrene resins, polyester resins, polycarbonate resins, polysulfone resins, polyarylate resins, polyphenylene sulfide resins, and polyetherimide resins as well as various mixtures of other thermoplastic resins. By "substantially free" is meant that the compositions contain less than 5% by weight, preferably less than 3% by weight, more preferably less than 1 % by weight, and most preferable essentially none of the other thermoplastic resins, wherein all percentages by weight are based upon the entire weight of the composition.

The thermoplastic composition of the invention may comprise any of the following additives: stabilizers, dyes, and pigments.

A suitable level of the various components depends on several factors, such as the end-use of the product, the level of impact strength desired, and the particular type and characteristics of other components which are present.

In a preferred embodiment, the invention includes a semi-transparent thermoplastic composition comprising at least about 50%, preferably at least about 60% by weight of a poly(phenylene ether) resin based on the weight of the entire composition, about 49%, preferably about 39% to about 1% by weight of a non-elastomeric styrenic resin, including crystal polystyrene resin, and about 1% to about 10%, preferably to about 5% by weight of an unsaturated elastomeric styrenic block copolymer, wherein the percentage of light transmission between about 350 nm and about 700 nm is at least 28% of the incident light when measured at a thickness of 0.125 inches.

The compositions of the present invention can be prepared by a variety of methods involving intimate admixing of the materials with any additional additives desired in the formulation. A preferred procedure includes melt blending, although solution blending is also possible. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. The temperature of the melt in the present process is preferably minimized in order to avoid excessive degradation and gel formation in the styrene-butadiene copolymer. It is desirable to maintain the melt temperature between about 200° C. and about 330° C., although higher temperatures can be used provided that the residence time of the resin in the processing equipment is kept short. In some instances, the compounded material exits the extruder through small exit holes in a die and the resulting strands of molten resin are cooled by passing the strands through a water bath. The cooled strands can be chopped into small pellets for packaging and further handling.

The physical form and size of the PPE is important to obtaining a smooth surface composition with a low gel content. As the PPE particle size increases, the shear heating in the compounding equipment is increased and the styrene-butadiene copolymer degrades and becomes cross-linked. The cross-linked material may appear as unacceptable gels on the surface of an extruded sheet of the composition. In order to minimize the formation of gels, the use PPE powder is preferred in process of the present invention. By powder is meant a PPE particle size wherein at least 80 weight percent of the PPE will pass through a 3000 micron sieve, more preferably at least 90 weight percent will pass through a 2000 micron sieve. Typically, the PPE used in the present G-1650: a commercially available polystyrene-poly(ethylenebutalene)-polystyrene available from Shell as Kraton G1650, G-1651: a commercially available polystyrene-poly(ethylenebutalene)- polystyrene available from Shell as Kraton G1651.

The ingredients were compounded in the weight ratios as indicated in the following table in a twin-screw extruder with temperature settings over the length of the extruder between about 280 and about 310° C. The screw speed was 300 rpm, the throughput 10 kilograms per hour. All ingredients were fed at the throat of the extruder. The strands coming from the extruder were pelletized and dried for about 3 hours at about 110° C. The dried pellets were injection molded into standard ASTM test specimens for measurement of physical properties. The percentage of light transmission between about 350 nm and about 700 nm was measured at a thickness of 0.125 inches.

TABLE 1

| Sample | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| PPE, 0.33 | 20 | | 20 | | | | 70 | 20 | | | | | | | | | 70 |
| PPE, 0.46 | | 20 | | 70 | 45 | 20 | | | 70 | 70 | 70 | 70 | 70 | 70 | 70 | 70 | |
| PS, 2 MFI | 78 | | | 28 | 24.5 | 70 | 20 | | 28 | | 28 | | 28 | | 28 | | |
| PS, 16 MFI | | 70 | 78 | | 24.5 | | | 78 | | 27 | | 28 | | 28 | | 28 | |
| F-530 | | | | | | | | | | | | | | | | | 22.5 |
| D-1102 | 2 | 10 | 2 | 2 | 6 | 10 | 10 | | | | | | | | | | 7.5 |
| D-1101 | | | | | | | | 2 | 2 | 2 | | | | | | | |
| V 2518 | | | | | | | | | | | 2 | 2 | | | | | |
| G-1652 | | | | | | | | | | | | | 2 | 2 | | | |
| G-1651 | | | | | | | | | | | | | | | 2 | 2 | |
| % transmission | 19.6 | 9.4 | 18.78 | 29.16 | 10.0 | 10.53 | 11.23 | 22.81 | 34.46 | 33.77 | 34.52 | 33.48 | 23.05 | 21.85 | 9.46 | 9.19 | 38.58 | invention is in the form as collected after precipitation with a non-solvent, e.g., methanol, from the reaction polymerization medium, e.g., toluene.

It should be clear that thermoplastic compositions made by the process described herein are another embodiment of the present invention. It should also be clear that articles formed out of the thermoplastic compositions described herein are another embodiment of the present invention.

All patents cited are incorporated herein by reference.

The invention will be further illustrated by the following examples.

Experimental

In the examples the following materials have been used:

PPE: a poly(2,6-dimethyl-1,4-phenylene ether) with an intrinsic viscosity of either 0.33 or 0.46 ml/g as measured in toluene at 25° C. and a concentration of 0.6 gram per 100 ml;

F-530: Finaclear 530: a tapered block copolymer of polystyrene and polybutadiene and having an overall styrene content of about 75% by weight and commercially available from Fina Oil Company;

PS: crystal polystyrene resin available from BASF and Chevron as grades 1800P and EB3300, respectively;

D-1102: a commercially available mixture of polystyrene-polybutadiene with polystyrene-polybutadiene-polystyrene available from Shell as Kraton D1102, D-1101: a commercially available mixture of polystyrene-polybutadiene with polystyrene-polybutadiene-polystyrene available from Shell as Kraton D1101, V-2518: a commercially available polystyrene-polybutadiene-polystyrene available from Dexco as Vector V-2518, Examination of the properties of samples in Table 1 illustrates part of the unexpected results for obtaining compositions of PPE, a non-elastomeric styrenic resin, and an unsaturated elastomeric styrenic block copolymer, wherein the percentage of light transmission between about 350 nm to about 700 nm is at least 28% of the incident light when measured at a thickness of 0.125 inches. For example, samples 4, 9 to 12, and 17 illustrate compositions of the invention. Comparison of samples 1 to 3 with sample 4 illustrate compositions that do not contain an effective amount of PPE to afford the desired minimum degree of light transmission.

Samples 13 to 16 that contain a saturated elastomeric styrenic block copolymer do not result in the desired degree of light transmission (i.e. at least 28%). It is unexpected both that the unsaturated (i.e. polybutadiene) elastomeric block copolymers containing compositions resulted in the desired degree of light transmission and further that the saturated (i.e. poly(ethylenebutylene)) elastomeric block copolymer containing compositions had significantly lower degrees of light transmission than the compositions containing the unsaturated block copolymers. Moreover, the compositions containing less than an effective amount of PPE also do not have the desired degree of light transmission. It should be noted that samples containing a non-elastomeric styrenic resin, e.g., a styrene-butadiene block copolymer having at least about 50% by weight styrene content, have enhanced processability over samples not containing the that do not contain the non-elastomeric styrenic resin.

The preceding examples are set forth to illustrate specific embodiments of the invention and are not intended to limit its scope. It should be clear that the present invention includes articles from the compositions as well as method to make compositions and articles as described herein. Additional embodiments and advantages within the scope of the claimed invention will be apparent to one or ordinary skill in the art.

What is claimed:

1. A semi-transparent thermoplastic composition having a light transmission, wherein the percentage of light transmission between about 350 nm and about 700 nm is at least 28% of the incident light when measured at a thickness of 0.125 inches, the composition comprising:
   a) at least about 50% by weight of a poly(phenylene ether) resin based on the weight of the entire composition,
   b) a non-elastomeric styrenic resin selected from the group consisting of radial block copolymers of butadiene and styrene wherein the styrene content in the copolymers is at least 50% by weight based on the weight of the copolymers, tapered block copolymers of butadiene and styrene wherein the styrene content in the copolymers is at least 50% by weight based on the weight of the copolymers, and mixtures of the foregoing, and
   c) about 1% to less than 10% by weight of an elastomeric styrenic block copolymer based on the weight of the entire composition, wherein the elastomeric styrenic block copolymer is selected from the group consisting polystyrene-polybutadiene (SBR), poly($\alpha$-methylstyrene)-polybutadiene, polystyrene-polybutadiene-polystyrene (SBS), poly($\alpha$-methylstyrene)-polybutadiene-poly($\alpha$-methylstyrene), and mixtures of the foregoing.

2. The composition of claim 1, wherein the styrene content in the non-elastomeric styrenic resin is between about 65% and 80% by weight based on the weight of the copolymers.

3. The composition of claim 1, wherein the poly(phenylene ether) resin is present in an amount of at least about 60 percent by weight based upon the weight of the entire composition.

4. The composition of claim 1, wherein the non-elastomeric styrenic resin comprises a radial block copolymer of butadiene and styrene having a styrene content of about 75% to about 77% by weight based on the weight of the radial block copolymer.

5. The composition of claim 1, wherein the non-elastomeric styrenic resin has a butadiene block length and structure resulting in rubbery domains that are smaller than the wavelength of visible light.

6. The composition of claim 1, further comprising at least one additive selected from the group consisting of stabilizers, dyes, pigments, mineral oil, and mixtures thereof.

7. The composition of claim 1, wherein the composition is substantially free of polyamide resins, high impact polystyrene resins, polyester resins, polycarbonate resins, polysulfone resins, polyarylate resins, polyphenylene sulfide resins, polyetherimide resins, and mixtures of the foregoing.

8. Articles formed out of the composition of claim 1.

9. A semi-transparent thermoplastic composition having a light transmission, wherein the percentage of light transmission between about 350 nm and about 700 nm is at least 28% of the incident light when measured at a thickness of 0.125 inches, the composition consisting essentially of:
   a) at least about 50% by weight of a poly(phenylene ether) resin based on the weight of the entire composition,
   b) a non-elastomeric styrenic resin selected from the group consisting of radial block copolymers of butadiene and styrene wherein the styrene content in the copolymers is at least 50% by weight based on the weight of the copolymers, tapered block copolymers of butadiene and styrene wherein the styrene content in the copolymers is at least 50% by weight based on the weight of the copolymers, and mixtures of the foregoing, and
   c) about 1% to less than 10% of an elastomeric styrenic block copolymer based on the weight of the entire composition, wherein the elastomeric styrenic block copolymer is selected from the group consisting of polystyrene-polybutadiene (SBR), poly($\alpha$-methylstyrene)-polybutadiene, polystyrene-polybutadiene-polystyrene (SBS), poly($\alpha$-methylstyrene)-polybutadiene-poly($\alpha$-methylstyrene), and mixtures of the foregoing.

10. A method to make a semi-transparent thermoplastic having a light transmission, wherein the percentage of light transmission between about 350 nm and about 700 nm is at least 28% of the incident light when measured at a thickness of 0.125 inches, wherein said method comprises melt-mixing:
    a) at least about 50% by weight of a poly(phenylene ether) resin based on the weight of the entire composition,
    b) a non-elastomeric styrenic resin selected from the group consisting of radial block copolymers of butadiene and styrene wherein the styrene content in the copolymers is at least 50% by weight based on the weight of the copolymers, tapered block copolymers of butadiene and styrene wherein the styrene content in the copolymers is at least 50% by weight based on the weight of the copolymers, and mixtures of the foregoing, and
    c) about 1% to less than 10% of an elastomeric styrenic block copolymer based on the weight of the entire composition, wherein the elastomeric styrenic block copolymer is selected from the group consisting of polystyrene-polybutadiene (SBR), poly($\alpha$-methylstyrene)-polybutadiene, polystyrene-polybutadiene-polystyrene (SBS), poly($\alpha$-methylstyrene)-polybutadiene-poly($\alpha$-methylstyrene), and mixtures of the foregoing.

11. A method to make a semi-transparent thermoplastic having a light transmission, wherein the percentage of light transmission between about 350 nm and about 700 nm is at least 28% of the incident light when measured at a thickness of 0.125 inches, wherein said method comprises melt-mixing at least about 50% by weight of a poly(phenylene ether) resin based on the weight of the entire composition, a non-elastomeric styrenic resin selected from the group consisting of radial block copolymers of butadiene and styrene wherein the styrene content in the copolymers is at least 50% by weight based on the weight of the copolymers tapered block copolymers of butadiene and styrene wherein the styrene content in the copolymers is at least 50% by weight based on the weight of the copolymers, and mixtures of the foregoing, and about 1% to less than 10% of an elastomeric unsaturated styrenic block copolymer based on the weight of the entire composition, wherein the composition is substantially free of polyamide resins, high impact polystyrene resins, polyester resins, polycarbonate resins, polysulfonate resins, polyarylate resins, polyphenylene sulfide resins, and polyetherimide resins, and wherein rubbery domains in the composition are smaller than the wavelength of visible light.

12. The method of claim 11, wherein the styrene content in the non-elastomeric styrenic resin is between about 65% and 80% by weight based on the weight of the copolymers.

13. The method of claim 11, wherein the poly(phenylene ether) resin is present in an amount of at least about 60 percent by weight based upon the weight of the entire composition.

14. The method of claim 1, wherein the non-elastomeric styrenic resin comprises a radial block copolymer of butadiene and styrene having a styrene content of about 75% to about 77% by weight based on the weight of the radial block copolymer.

15. The method of claim 11, wherein the non-elastomeric styrenic resin has a butadiene block length and structure resulting in rubbery domains that are smaller than the wavelength of visible light.

16. The method of claim 11, further comprising at least one additive selected from the group consisting of stabilizers, dyes, pigments, mineral oil, and mixtures thereof.

17. A semi-transparent thermoplastic composition having a light transmission, wherein the percentage of light transmission between about 350 nm and about 700 nm is at least 28% of the incident light when measured at a thickness of 0.125 inches, the composition comprising at least about 50% by weight of a poly(phenylene ether) resin based on the weight of the entire composition, a non-elastomeric styrenic resin selected from the group consisting of radial block copolymers of butadiene and styrene wherein the styrene content in the copolymers is at least 50% by weight based on the weight of the copolymers, tapered block copolymers of butadiene and styrene wherein the styrene content in the copolymers is at least 50% by weight based on the weight of the copolymers, and mixtures of the foregoing, and about 1% to less than 10% of an elastomeric unsaturated styrenic block copolymer based on the weight of the entire composition, wherein the composition is substantially free of polyamide resins, high impact polystyrene resins, polyester resins, polycarbonate resins, polysulfonate resins, polyarylate resins, polyphenylene sulfide resins, and polyetherimide resins.

18. The composition of claim 17, wherein the styrene content in the non-elastomeric styrenic resin is between about 65% and 80% by weight based on the weight of the copolymers.

19. The composition of claim 17, wherein the poly(phenylene ether) resin is present in an amount of at least about 60 percent by weight based upon the weight of the entire composition.

20. The composition of claim 17, wherein the non-elastomeric styrenic resin comprises a radial block copolymer of butadiene and styrene having styrene content of about 75% to about 77% by weight based on the weight of the radial block copolymer.

21. The composition of claim 17, wherein the non-elastomeric styrenic resin has a butadiene block length and structure resulting in rubbery domains that are smaller than the wavelength of visible light.

22. The composition of claim 17, further comprising at least one additive selected from the group consisting of stabilizers, dyes, pigments, mineral oil, and mixtures thereof.

* * * * *